United States Patent
Sokolowski (10) Patent No.: US 8,531,983 B2
(45) Date of Patent: Sep. 10, 2013

(54) SYSTEM AND METHOD FOR IDENTIFYING A LENGTH OF AN INSTALLED FIBER CABLE

(75) Inventor: Daniel R. Sokolowski, Yorkville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 236 days.

(21) Appl. No.: 13/037,137

(22) Filed: Feb. 28, 2011

(65) Prior Publication Data

US 2012/0219283 A1 Aug. 30, 2012

(51) Int. Cl.
*H04L 1/00* (2006.01)
*H04L 12/26* (2006.01)

(52) U.S. Cl.
USPC .......................................................... 370/252

(58) Field of Classification Search
USPC .......................................................... 370/352
See application file for complete search history.

(56) References Cited

U.S. PATENT DOCUMENTS

| 2004/0213202 A1* | 10/2004 | Funatsu | 370/352 |
| 2010/0158041 A1* | 6/2010 | Gunadisastra et al. | 370/463 |
| 2010/0215049 A1* | 8/2010 | Raza et al. | 370/401 |

* cited by examiner

*Primary Examiner* — Ayaz R. Sheikh
*Assistant Examiner* — Blanche Wong
(74) *Attorney, Agent, or Firm* — Hamilton, Brook, Smith & Reynolds, P.C.

(57) ABSTRACT

Current approaches for determining and identifying whether a correct length of fiber cable is installed between network elements configured to communicate using specific lengths of cable require manual inspection. Such manual inspection may include the use of markers used for visual inspection of cables matching corresponding network elements. An embodiment of the present invention utilizes identifiers unique to cables of various lengths to determine whether a correct length of cable has been installed. Further, embodiments of the present invention determine whether the unique identifier is received by a network device according to a channel mapping corresponding to a unique physical mapping associated with cables of various lengths. The use of the identifiers and channel mappings enable automatic discovery of lengths of cable that are installed between network devices.

28 Claims, 8 Drawing Sheets

SYSTEM AND METHOD FOR IDENTIFYING A LENGTH OF AN INSTALLED FIBER CABLE

BACKGROUND OF THE INVENTION

Fiber-optic communication is a method of transmitting information from one place to another by sending pulses of light through an optical fiber. The light forms an electromagnetic carrier wave that is modulated to carry information. Because of its advantages over electrical transmission, optical fibers have largely replaced copper wire communications in core networks.

The process of communicating using fiber-optics involves the following basic steps: creating the optical signal involving the use of a transmitter, relaying the signal along the fiber, ensuring that the signal does not become too distorted or weak, receiving the optical signal, and converting it into an electrical signal.

Some optical paths include a working path and protection path, and having both paths operational is useful for integrity and reliability of a network.

SUMMARY OF THE INVENTION

An embodiment of the present invention is a method, corresponding apparatus, or corresponding communications system for identifying a length of an installed cable. The embodiment enables a signaling interface to receive an identifier unique for a multi-channel cable of a given length. The embodiment also determines whether an identifier received by the signaling interface matches an identifier expected to be received and reports whether the identifier received matches the identifier expected to be received.

Another embodiment of the present invention is a method, corresponding apparatus, or corresponding communications system for identifying a length of an installed cable. The embodiment includes a multi-channel cable having a given length. The multi-channel cable is selected from among multiple predefined lengths and has at least two channels with unique physical mapping corresponding to the given length. In addition, the embodiment includes a transmitter module that transmits an identifier on the at least two channels according to a channel mapping. The channel mapping corresponds to the physical mapping for the given length. Further, the embodiment includes a receiver module configured to receive the identifier and determine whether the identifier received matches an identifier expected to be received on the at least two channels according to the channel mapping.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Example embodiments of the present invention include methods, apparatuses, and communications system for identifying a length of an installed fiber cable. Fiber optic networks, like any other network, have network latency when delivering traffic from a source to a destination. Network latency is herein defined as a time delay for a signal, such as an optical signal carrying data, to transmit from one network node to another. Usually, to determine network latency, origin and destination points in the network are used to define a network communications path over which the signal traverses. In some cases, network latency may be defined herein as the time it takes a signal to make a full circuit back to an originating point, such as a given node in a ring configuration network of nodes.

The main premise in network latency is that the time of transmission between an origin and destination should be instantaneous. Of course, there will always be some delay. Even transmission at the speed of light is not instantaneous and can be measured with very precise instruments.

There are a number of factors that contribute to network latency. These include transmission, propagation, switches or routers, and computer hardware delays. All of these factors are relevant to the overall determination of network latency. In some cases, there may not be a delay the user can notice. However, if network latency increases to an extent it becomes a problem, there are typically options available to adjust the source of the delay.

In network latency, a transmission medium refers to the medium used to convey transmitted signals. Examples include a phone line, fiber optic lines or wireless connection, and each contributes to the delay, though some contribute more (or less) than others. To help reduce network latency, it may be possible to change the medium to a faster (i.e., less delay-causing) type.

Propagation delay is difficult to control in network latency. Propagation delay is simply the amount of time it takes for a signal to travel from a source node to a destination node over a medium. Propagation delay may be computed as the ratio between a link length (length of the medium) and the propagation speed over the specific medium. Naturally, the greater the distance, the more delayed the transmission will be from source to destination node.

In addition, latency in optical networks may occur due to skew between or among optical fibers. Skew in optical fibers may arise for a number of different reasons. For example, one source of skew in optical fibers is an index of refraction variation from fiber to fiber. Another cause of skew in some optical links is the physical length difference in fibers in the cable or due to an incorrect cable length.

Certain switches in an optical network are configured to operate with specific lengths of optical cables, and, thus, specific lengths of fiber. Incorrect installation of an optical cable may cause network transmission problems. For example, the network may drop traffic due to congestion caused by the incorrect installation. However, when attempting to correct the transmission problems, network administrators often first look to errors that are traffic-related on the physical layer, such as errors in transmitting, receiving, buffer settings, and other well known traffic-related errors found through readily available trouble-shooting procedures. In contrast, network administrators currently have no way of automatically determining whether an optical cable of correct length has been installed. Thus, network administrators rarely check for such an error, which can lead to days, weeks, or months of trouble shooting from a system level investigation, which means that personnel and path availability are not handling other, more profitable, activities during the trouble-shooting.

One naïve approach to prevent incorrect cable installation is to color code interconnect elements (e.g., network switches and transceivers) and their associated cables. For example, a 10 meter cable may be manufactured with a red color band to match a 10 meter transceiver manufactured with a red color band. However, this approach requires logical coordination of resources, such as internal or external cable manufacturing groups. For instance, color coding requires greater management of piece-part inventory. In addition, the cost of the inventory increases. Further, incorrect installation may still occur due to human error, during installation or incorrect color coding during system or cable assembly processes.

Embodiments of the present invention relate to automatically identifying a length of an installed fiber cable. An embodiment of the present invention is a method, corresponding apparatus, or corresponding communications system for identifying a length of an installed cable. The method includes enabling a signaling interface to receive an identifier unique for a multi-channel cable of a given length. The method further includes: determining whether an identifier received by the signaling interface matches an identifier expected to be received, and reporting whether the identifier received matches the identifier expected to be received.

The multi-channel cable with the given length may be selected from among multiple predefined lengths and may include at least two channels with unique physical mapping corresponding to the given length.

The method may further include enabling a physical interface to couple with the multi-channel cable and transmitting an identifier on the at least two channels via the physical interface according to a channel mapping, the channel mapping corresponding to the physical mapping for the given length. The channel mapping may also correspond to the physical interface, signaling interface, or a combination thereof.

Further, the method may also include enabling the signaling interface to employ a unique identifier for each channel of the multi-channel cable. In addition, transmitting an identifier may further include employing a unique identifier for each channel of the multi-channel cable.

The method may include enabling the signaling interface to receive a unique identifier for the at least two channels and to receive a common identifier for at least a subset of additional channels. In addition, transmitting an identifier may further include transmitting a unique identifier for the at least two channels and transmitting a common identifier for at least a subset of additional channels.

The signaling interface may be enabled to receive the identifier via a logical signal. In addition, transmitting the unique identifier may further include transmitting the unique identifier via a logical signal.

Determining whether the identifier received matches the identifier expected to be received may include determining whether the identifier received on the at least two channels of the multi-channel cable matches a channel mapping, wherein the channel mapping corresponds to the physical mapping for the given length.

In addition, a table of channel mappings corresponding to respective predefined lengths may be accessed to determine whether the identifier received matches the identifier expected to be received. Further, the multi-channel cable may be an optical cable.

The method may also include identifying a discrepancy between the identifier received and the identifier expected to be received and reporting to a craftsperson that the multi-channel cable is an incorrect length, a correct length of cable to install, or that a port to which the cable is coupled is an incorrect port. In addition, upon identifying a discrepancy between the identifier received and the identifier expected to be received, the method may disable initialization of communications traffic via the multi-channel cable.

An apparatus and communications system corresponding to the above-described embodiments of an example method are contemplated within the scope of embodiments of the present invention.

Figure 1:
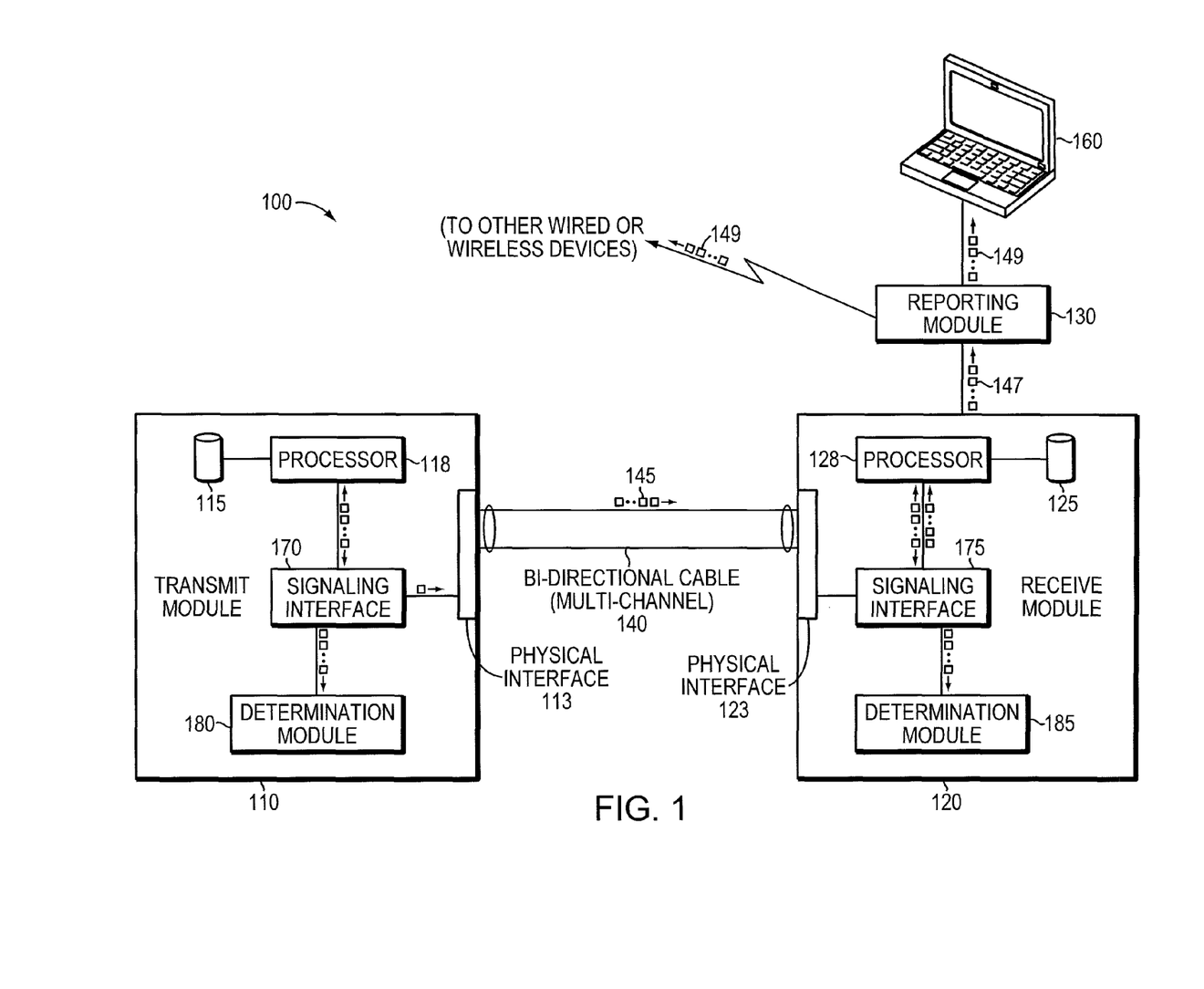
FIG. 1 is a network diagram of an example embodiment of the invention that illustrates operably interconnected network elements.

FIG. 1 is a network diagram of an example embodiment of the invention that illustrates operably interconnected network elements. The network elements include a transmit module 110 and a receive module 120 interconnected by a bi-directional multi-channel cable 140 via a physical interface 113 of the transmit module 110 and a physical interface 123 of the receive module 120. Both the transmit module 110 and the receive module 120 are configured to communicate via a bi-directional multi-channel cable 140 of a given length. The bi-directional multi-channel cable 140 may be an optical cable.

Further, the receive module 120 is also connected to a reporting module 130. The connection between the receive module 120 and the reporting module may be a wired or wireless connection. Although the reporting module 130 is illustrated as a separate apparatus, the reporting module 130 may be implemented in either the transmit module 110 or receive module 120 via hardwired circuitry or logical interface.

The reporting module 130 is configured to communicate a reporting message 149 using a local wireless (or wired) protocol, such as Bluetooth®, to a computer 160. In addition, the reporting module 130 is also configured to communicate the report message 149 using a remote access protocol, such as a Wireless Fidelity (WiFi) protocol using IEEE 802.11, for example, via a base transceiver station (not shown) in accordance with an example embodiment of the present invention. The reporting module may communicate the report message 149 to the base transceiver station or to other wired or wireless devices via the base transceiver station. Wireless devices may include cell phones, smart phones, and personal digital assistants (PDAs).

In this example, the transmit module 110 includes a signaling interface 170 operably connected to the physical interface 113. The signaling interface 170 may be a logical interface. Further, the transmit module includes a data store 115, processor 118, and a determination module 180. The transmit module is configured to interconnect with the receive module 120 via the bi-directional cable 140 of a given length. Further, the bi-directional cable 140 of the given length is configured to have a physical mapping corresponding to the given length. The physical mapping of the bi-directional cable 140 may be a unique configuration of channels within the cable. For example, the cable may have multiple channels or optical fibers organized in a manner unique to the given length. For instance, several channels of the cable may be swapped as described below in reference to FIGS. 2A-2C.

As stated above, the transmit module 110 is configured to operate with a cable of specific length. Upon installation of the bi-directional cable 140, the transmit module 110 begins initialization procedures by first determining whether a correct bi-directional multi-channel cable 140 has been installed. The signaling interface 170 accesses the data store 115 via processor 118 to obtain an identifier unique to the bi-directional cable 140 of a given length that should be installed. In addition to the identifier, the signaling interface 170 obtains a channel mapping corresponding to the physical mapping of the bi-directional cable 140 of a given length that should be installed. The data store 115 includes a table that associates cable lengths with the identifier unique to the cable length and associated channel mappings.

Upon retrieving the identifier associated with the bi-directional cable 140 that should be installed and the channel mapping, the signaling interface 170 transmits the identifier via a communications message 145 to the receive module 120. The signaling interface 170 transmits the identifier on at least two channels of the multi-channel bi-directional cable 140 according to the channel mapping that corresponds to a physical mapping for the given length of the multi-channel bi-directional cable that should be installed. For example, the identifier unique to the bi-directional cable 140 of a given length that should be installed is transmitted via the communication message 145 over selected channels of the bi-directional cable according to the channel mapping.

As stated above, the receive module 120 is also configured to operate with the same bi-directional cable 140 of a given length as the transmit module 110. Upon receiving the identifier via the communications message 145, the signaling interface 175 of the receive module 120 monitors the channels on which the communication message 145 is received.

The determination module 185 receives the communication message 145 and information related to the channels on which the communication message 145 is received from the signaling interface 175. The determination module 185 then accesses the data store 125 having a table of identifiers unique to cables of a given length associated with the cables of a given length and the channel mapping associated with a physical mapping of the cables of a given length. In addition, the data store 125 includes information regarding the specifications of the transmit module 110 and receive module 120 including an identifier that is expected to be received. The identifier expected to be received is based on a given length of cable the modules are configured to operate with. The determination module 185 determines whether the received identifier matches the identifier expected to be received. In addition, the determination module 185 determines whether the received identifier is received via channels of the cable corresponding to a channel mapping of a multi-channel cable that should be installed. If both match, then the determination module determines that the correct length of cable has been installed, and reporting module 130 sends a reporting message 149 to a local computer 160 and/or a remote station via a base transceiver station.

Alternatively, if the identifier is not received on the correct channels according to the channel mapping corresponding to the cable of a given length, then the determination module 185 determines that an incorrect length of cable has been installed and reporting module 130 reports the incorrect installation. In addition, determination module may also identify the incorrect length of cable that is installed by matching the channels on which the communication message 145 is received to a table held in the data store 125 that associated channel mappings to cables of given length. The reporting module 130 may also report the length of incorrect cable that is installed.

It should be noted, that an identifier unique for a multi-channel of a given length may not be used. The transmit module 110 and receive module 120 may match the channels communication messages 145 are transmitted and received on and match the data to a channel mapping corresponding to the physical mapping of cables of a given length. Thus, if the channels on which the communication messages 145 are transmitted and received match the channel mapping, the determination module 185 determines a correct length of cable is installed. Conversely, if it does not match, then the determination module 185 determines that an incorrect length of cable is installed and may determine the length of cable that has been installed by referring to a table of channel mappings associated with cables of given lengths in data store 125.

Further, it should be noted that although FIG. 1 illustrates the use of a multi-channel bi-directional cable, cables of any type may be implemented. For example, if the cable does not have multiple channels with unique physical mappings corresponding to different lengths of cable, the transmit module 110 and receive module 120 may identify the length of cable using only the identifier unique to a cable length. For example, as stated above, different transmission mediums (e.g., copper wire and optical fibers) transmit data at varying speeds. The transmit module 110 and receive module 120 may be configured to determine the speeds at which the identifier is received. For example, the identifier unique to a cable of given length is assigned a constant time of travel associated with the cable of given length.

Upon transmitting the identifier, the transmit module 110 may attach a transmit time stamp to the identifier. Further, upon receiving the identifier, the receive module 120 may attach a receive time stamp to the identifier. The determination module 185 then calculates the time of travel (i.e., latency) of the identifier as a difference between the receive time stamp and transmit time stamp and matches the time of travel to the constant time of travel. If the travel times match, the determination module 185 determines that a correct length of cable is installed. If the travel times do not match, the determination module 185 determines that an incorrect cable has been installed. In addition, the determination module 185 may also match the time of travel to a table of constant time of travels associated with given lengths of cable to determine the length of cable that is installed.

Figure 2A:
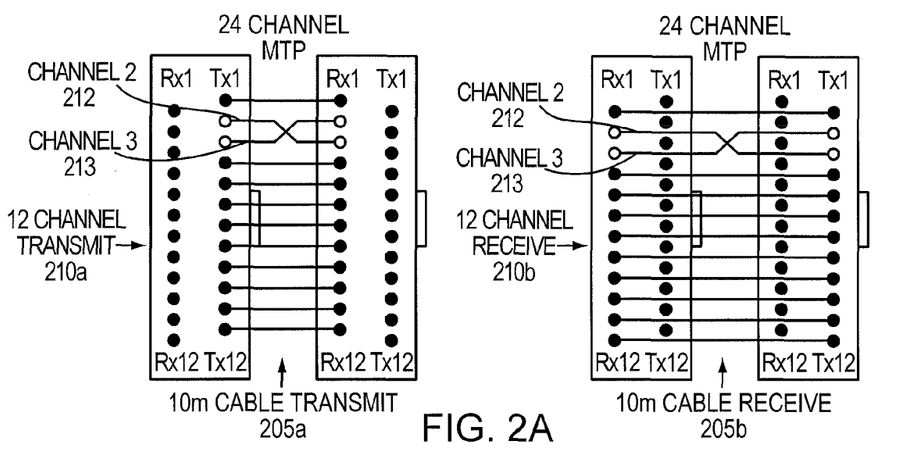
FIGS. 2A-2C are architectural diagrams of example embodiments of the invention that illustrates multi-channel cables of varied length having a unique physical mapping corresponding to the length of the multi-channel cables.
Figure 2B:
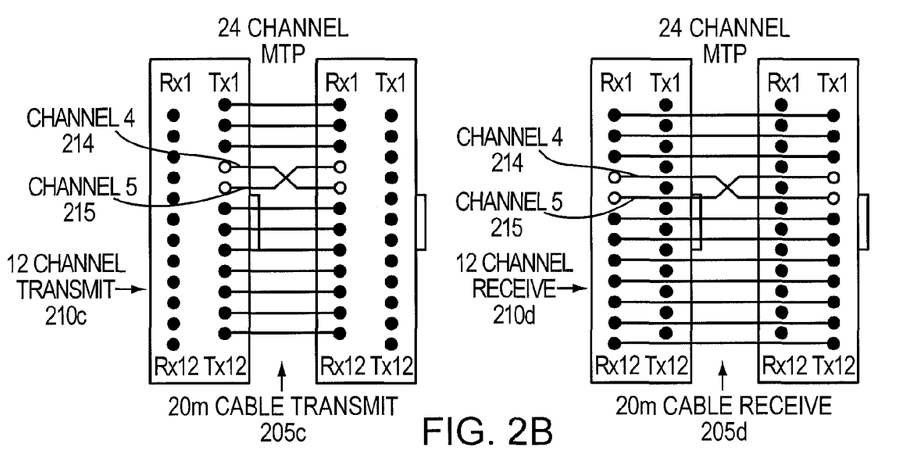
Figure 2C:
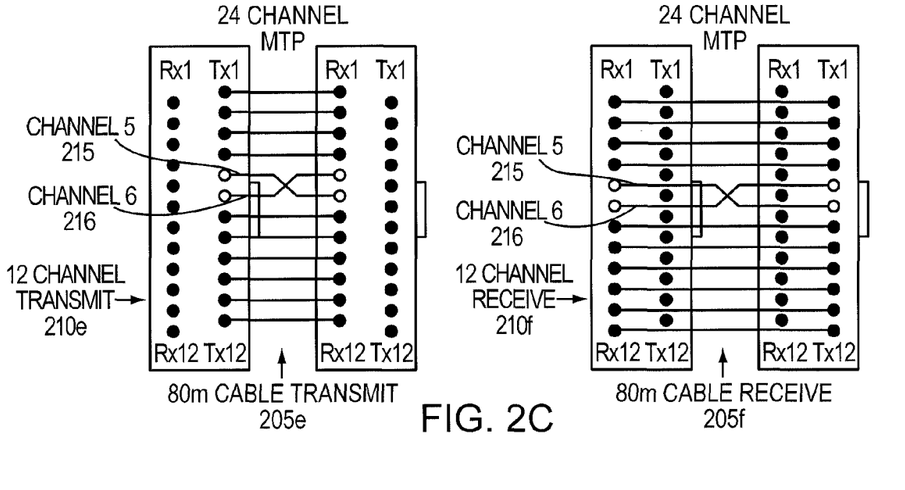

FIGS. 2A-2C are schematic diagrams of an example embodiment of the invention that illustrates multi-channel cables of varied length having a unique physical mapping corresponding to the length of the multi-channel cables.

FIG. 2A illustrates a 10 meter bi-directional multi-channel cable according to an example embodiment of the present invention. The cable has 24 channels of which 12 of the channels are transmit channels 205a and 12 of the channels of receive channels 205b. As illustrated, the 10 meter cable has a unique physical mapping wherein channel 2 212 and channel 3 213 of the transmit channels 205a are swapped. In addition, channels 2 212 and channels 2 213 of the receive channels 205b are swapped. Thus, referring to the description of FIG. 1, if communication messages 145 are transmitted from transmit module 110 via channel 2 212 from the transmit channels 205a of the 10 meter bi-directional cable, the communication messages 145 should be received by receive module 120 on channel 3 213 of the bi-directional cable 140.

FIG. 2B illustrates a 20 meter bi-directional multi-channel cable according to an example embodiment of the present invention. The 20 meter cable has 24 channels of which 12 of the channels are transmit channels 205c and 12 of the channels of receive channels 205d. As illustrated, the 20 meter cable has a unique physical mapping wherein channel 4 214 and channel 5 215 of the transmit channels 205c are swapped. In addition, channels 4 214 and channels 5 215 of the receive channels 205d are swapped.

FIG. 2C illustrates an 80 meter bi-directional multi-channel cable according to an example embodiment of the present invention. The 80 meter cable has 24 channels of which 12 of the channels are transmit channels 205e and 12 of the channels of receive channels 205f. As illustrated, the 20 meter cable has a unique physical mapping wherein channel 5 215 and channel 6 216 of the transmit channels 205e are swapped. In addition, channels 5 215 and channels 6 216 of the receive channels 205f are swapped.

It should be noted that any of the channels illustrated in FIGS. 2A-2C may swapped to create a unique physical mapping for cables of a given length. In addition, any length of cable may used, with each length of cable having a unique physical mapping.

Figure 3:
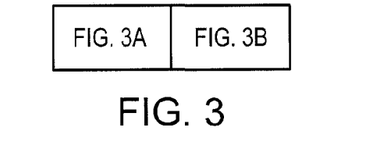
FIG. 3 is a network diagram of an embodiment of the present invention that illustrates connection paths between interconnected network elements.
Figure 3A:
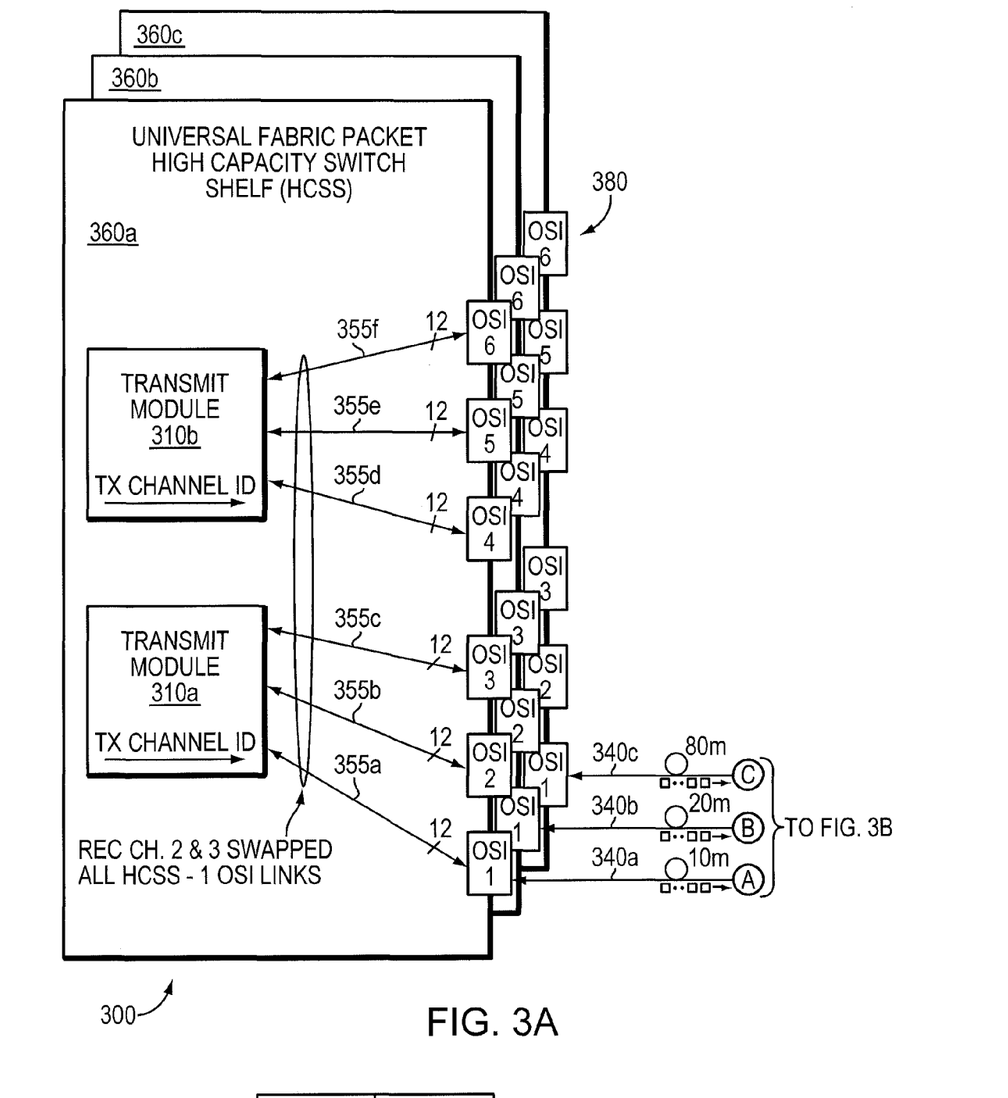
Figure 3B:
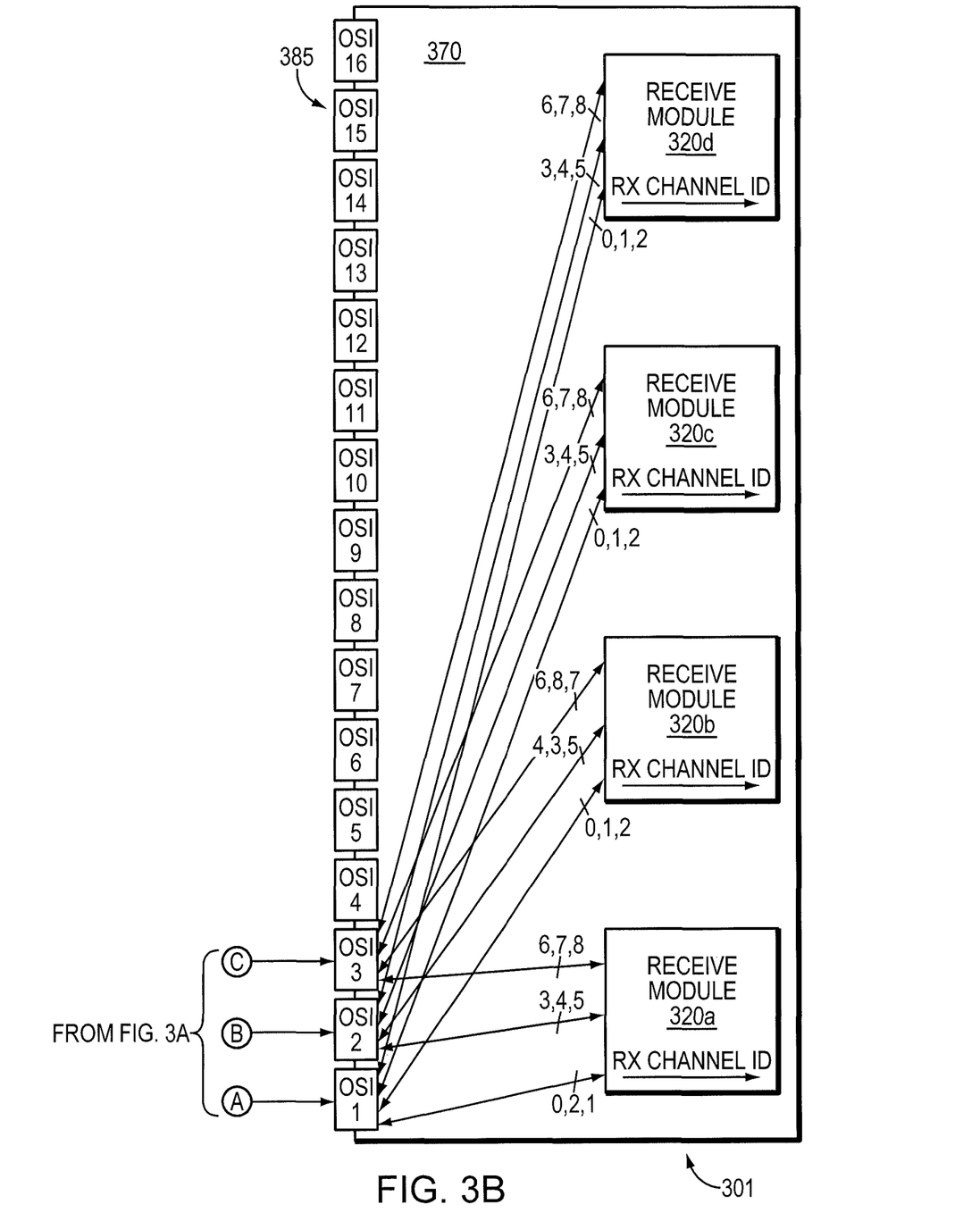

FIG. 3 is a network diagram of an embodiment of the present invention that illustrates connection paths between interconnected network elements. A network element 300 includes multiple Universal Fabric Packet High Capacity Switch Shelves (HCSS) 360a-c. Each shelve may be configured for optical communications via optical shelf interconnects and optical fibers. Further, each shelf 360a-c includes transmit modules 310a-b. The transmit modules 310a-b may be fabric element switches. Each transmit module 310a-b is operably connected to optical shelf interconnects (OSI) 380. Further, each transmit module 310a-b terminates at three OSIs. Each OSI 380 may have 24 channels that include 12 transmit channels and 12 receive channels, with each channel mapped to the same transmit module 310a-b. The OSIs 380 are linked to OSIs 385 of an HCSS mate 370 that is configured to communicate with the HCSS 360a-c. The OSIs 380 are linked to OSIs 385 via bi-directional multi-channel cables 340a-c. Each cable may be of varying length based on the operating parameters of respective transmit modules 310a-b and receive modules 330a-d as discussed above in reference to FIG. 1. For example, cables 340a-c may be 10 meters, 20 meters, or 80 meters in length. Further, the HCSS mate 370 includes receive modules 320a-d. The receive modules 320a-d are operably connected to OSIs 385. In this example embodiment. The HCSS mate 370 has four receive modules 320a-d, which employ a mesh connection to the OSI devices 385. Each of the OSI devices has 12 bi-directional channels split between the four receive modules 320a-d. Thus, each OSI device 358 is connected to the four receive modules via three bi-directional channels per receive module 320a-d.

The transmit modules 310a-b and receive modules 330a-d are configured to validate the link connections (i.e., cable length) of the link between OSIs 380 and OSIs 385. The bi-directional cables 340 are configured to have a physical mapping corresponding to the length of the cable. The physical mapping of the bi-directional cables 340 may be a unique configuration of channels within the cable. For example, the cable may have multiple channels or optical fibers organized in a manner unique to the given length. For instance, several channels of the cable may be swapped as described above in reference to FIGS. 2A-2C.

As stated above, the transmit modules 310a-b are configured to operate with a cable of specific length. Upon installation of the bi-directional cables 340a-c, the transmit module 110 begins initialization procedures by first determining whether a correct bi-directional multi-channel cables 340a-c have been installed. The transmit modules 310-B obtain an identifier unique to the bi-directional cable 340a-c of a given length that should be installed. The length of cable that should be installed is based on operating parameters of the transmit modules 310a-b and corresponding receive modules 320a-d. In addition to the identifier, the transmit modules 310a-b obtain channel mappings corresponding to physical mappings of the bi-directional cables 340a-c of a given length that should be installed. The identifier and channel mappings may be obtained via a data store operably connected to the transmit modules 310a-b or receive modules 320a-d.

Upon retrieving the identifiers associated with the bi-directional cables 340a-c that should be installed and the channel mappings, the transmit modules 310a-b transmit the identifier via a communications message to the receive module 320a-d. The communication message is first sent to OSIs 380 via links 355a-f. The OSIs 380 then transmit the communication message over the bi-directional cables 340a-c corresponding to channel mappings corresponding to each cable of a given length that should be installed. For example, the communication message with the identifier is transmitted on at least two channels of the multi-channel bi-directional cables 340a-c according to the channel mapping that corresponds to a physical mapping for the given length of the multi-channel bi-directional cables 340a-c that should be installed.

As stated above, the receive module 120 is also configured to operate with the same bi-directional cable 140 of a given length as the transmit module 110. Upon receiving the identifier via the communications message 145, the receive modules 320a-c monitor the channels on which the communication message 145 is received and determine, based on the identifier and channel mappings, whether a correct cable has been installed.

Figure 4:
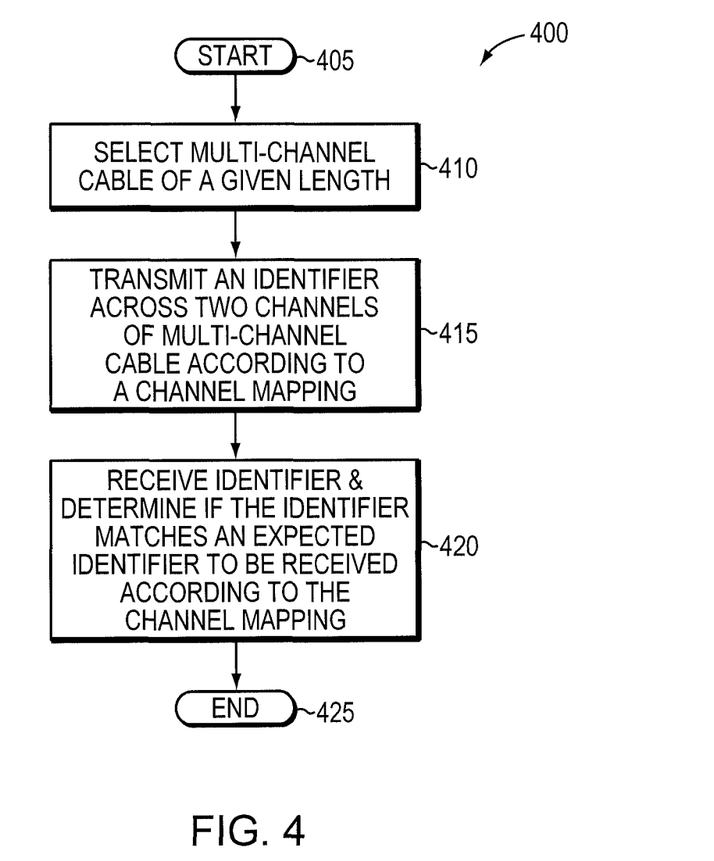
FIG. 4 is a flow diagram of an embodiment of the present invention that illustrates a method for identifying a length of an installed fiber cable.

FIG. 4 is a flow diagram of an embodiment of the present invention that illustrates a method 400 for identifying a length of an installed fiber cable. At 405 the method begins. At 410, a multi-channel cable if a given length is selected and installed. At 415, an identifier unique to a multi-channel cable of a given length that should be installed is transmitted across two channels of the multi-channel cable according to a channel mapping corresponding to a physical mapping of a multi-channel cable of the given length. At 420, the identifier is received, and a determination is made as to whether the identifier matches an identifier expected to be received according to the channel mapping. At 425, the method ends.

Figure 5:
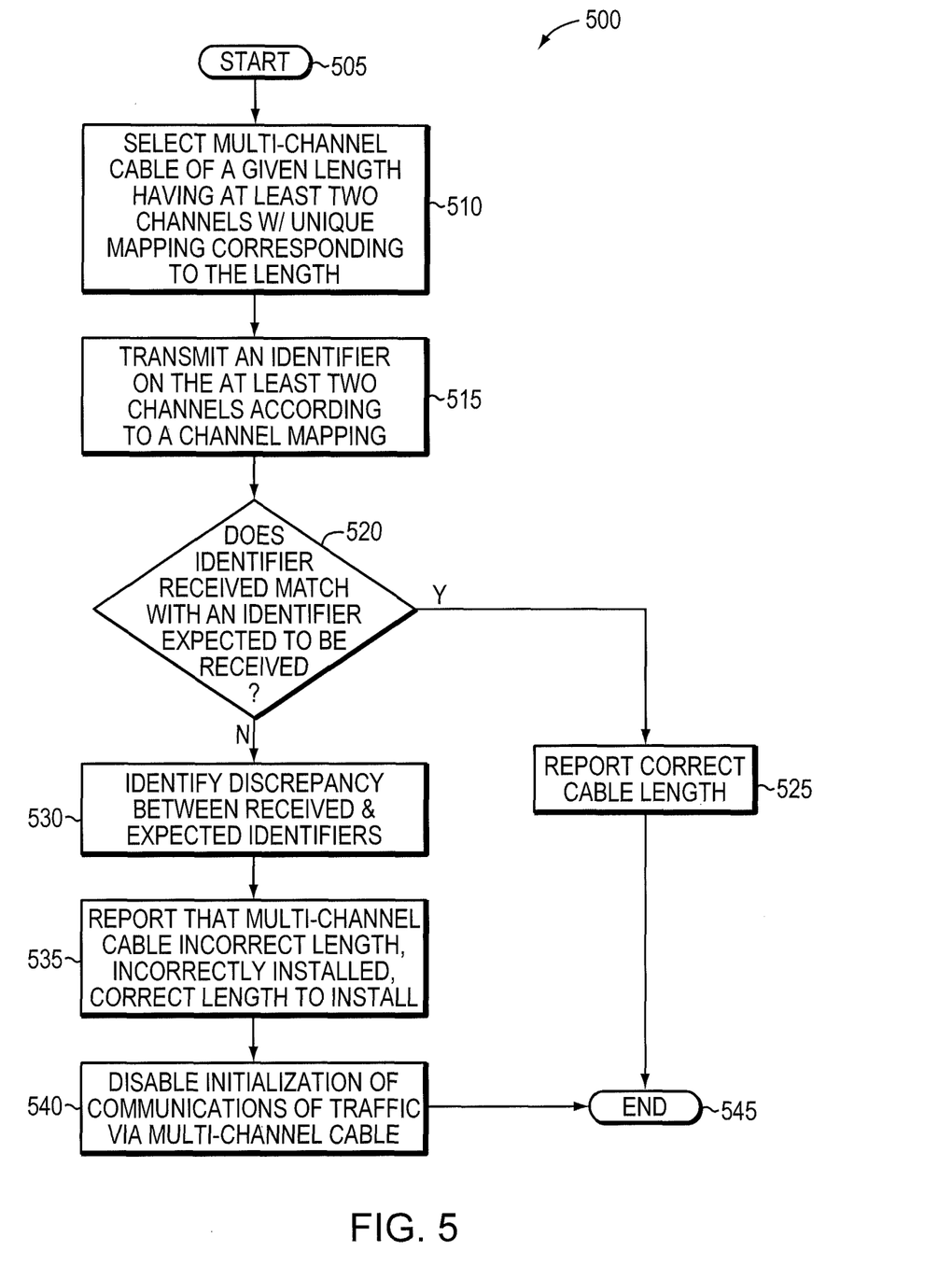
FIG. 5 is a flow diagram of an embodiment of the present invention that illustrates a method for determining whether an installed fiber cable is of correct length.

FIG. 5 is a flow diagram of an embodiment of the present invention that illustrates a method 500 for determining whether an installed fiber cable is of correct length. At 505, the method 500 begins. At 510, a multi-channel cable of a given length having at least two channels with a unique mapping corresponding to the length of cable is selected and installed. At 515, an identifier is transmitted on at least two of the channels according to the channel mapping. At 520, a determination is made as to whether the received identifier matches an identifier expected to be received according to the channel mapping. If the identifier matches the expected identifier, at 525, it is reported that a correct length of cable has selected and installed. At 545, the method ends.

If, however, the received identifier does not match with the expected identifier, at 530, a discrepancy between the received and expected identifiers is identified. At 535, it is reported that the multi-channel cable that was selected and installed is incorrect. The report may include information including at least one of the following: length of the incorrect cable, correct length but incorrectly installed, and a correct length of cable to install. At 540, initialization of communications via the multi-channel cable is disabled. At 545, the method ends.

Figure 6:
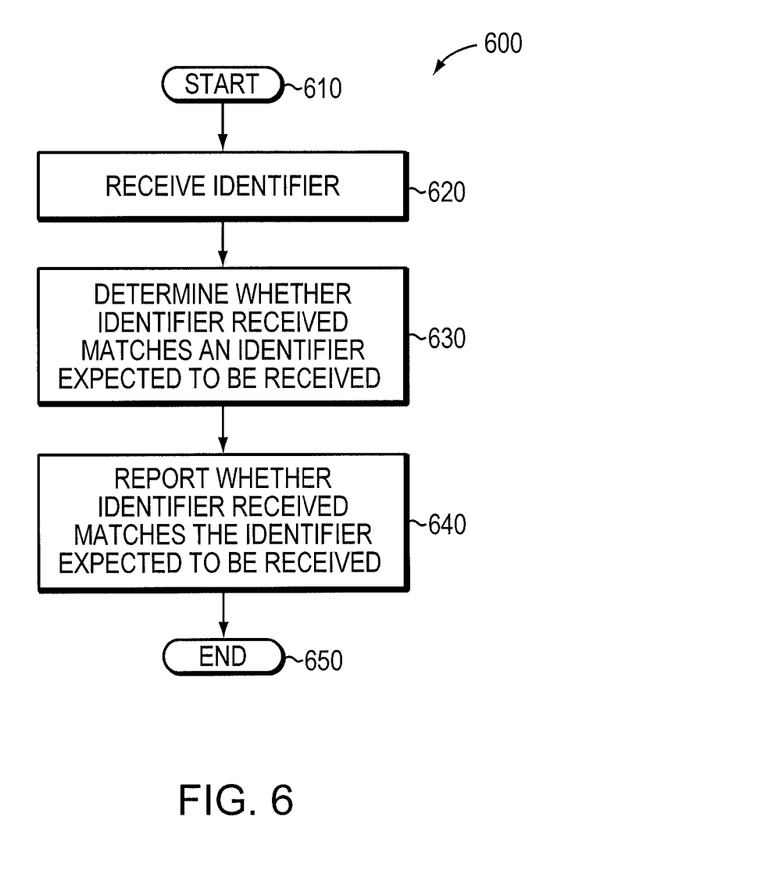
FIG. 6 is a flow diagram illustrating a method for reporting the length of an installed fiber cable.

FIG. 6 is a flow diagram illustrating a method 600 for reporting the length of an installed fiber cable. At 610, the method 600 begins. At 620, an identifier is received. At 630, it is determined whether the received identifier matches an identifier expected to be received. At 640, it is reported whether the received identifier matches the identifier expected to be received. At 650, the method 600 ends.

Figure 7:
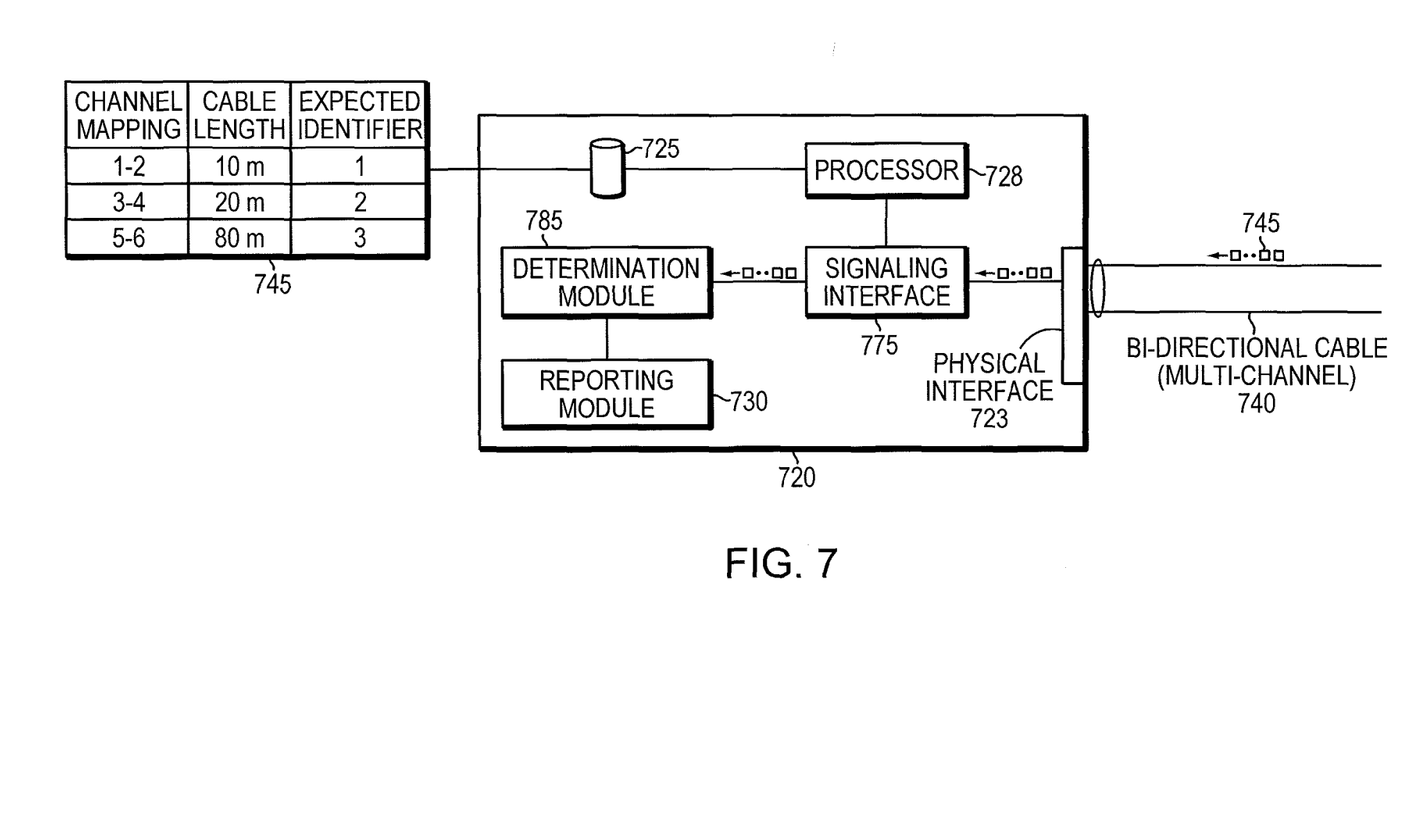
FIG. 7 is a block diagram of an example embodiment of the present invention that illustrates elements a network device for identifying a length of an installed fiber cable.

FIG. 7 is a block diagram of an example embodiment of the present invention that illustrates elements a network device 720 for identifying a length of an installed fiber cable.

A network device 720 is configured to receive communications via a bi-directional cable 740 of a given length based on the operating parameters of the network device. Before communications may begin, the network device 720 determines whether a correct bi-directional multi-channel cable 740 of a given length is installed to a physical interface 723. The network device 720 makes this determination based on a communication message 745 including an identifier. The identifier is unique for a multi-channel cable of a given length.

Upon receiving the identifier via the communications message 745, a signaling interface 775 of the network device 720 monitors the channels on which the communication message 745 is received. A determination module 785 receives the communication message 745 and information related to the channels on which the communication message 745 is received from the signaling interface 175. The determination module 785 then accesses the data store 725 having a table 745 of identifiers unique to cables of a given length associated with the cables of a given length and the channel mapping associated with a physical mapping of the cables of a given length. In addition, the data store 725 may include information regarding the specifications of the network device 720 including an identifier that is expected to be received. The identifier expected to be received is based on a given length of cable the network device 720 is configured to operate with. The determination module 785 determines whether the received identifier matches the identifier expected to be received. In addition, the determination module 785 determines whether the received identifier is received via channels of the cable corresponding to a channel mapping of a multi-channel cable that should be installed. If both math, then the determination module determines that the correct length of cable has been installed and reporting module 730 sends a reporting message of the correct installation.

Alternatively, if the identifier is not received on the correct channels according to the channel mapping corresponding to the cable of a given length, then the determination module 785 determines that an incorrect length of cable has been installed and reporting module 730 reports the incorrect installation. In addition, determination module 785 may also identify the incorrect length of cable that is installed by matching the channels on which the communication message 745 is received to the table 745 that associates channel mappings to cables of given length. The reporting module 730 may also report the length of incorrect cable that is installed.

Embodiments or aspects of the invention may be implemented in hardware, firmware, or software. If implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A communications system, comprising:
a signaling interface configured to receive an identifier unique to a given length of a multi-channel cable, the given length being selected from among multiple predefined lengths, the received identifier being one of a plurality of identifiers, and each of the plurality of identifiers being unique to one of the multiple predefined lengths;
a determination module configured to make a determination regarding whether the received identifier unique to the given length of the multi-channel cable received by the signaling interface matches an expected identifier expected to be received by the signaling interface; and
a reporting module configured to report the determination regarding whether the received identifier received matches the expected identifier expected to be received.

2. The system of claim 1 wherein the multi-channel cable has at least two channels with a unique physical mapping corresponding to the given length.

3. The system of claim 2 further comprising:
a physical interface configured to couple with the multi-channel cable; and
a transmitter module configured to transmit the identifier unique to the given length of the multi-channel cable on the at least two channels according to a channel mapping, the channel mapping corresponding to the unique physical mapping corresponding to the given length.

4. The system of claim 3 wherein the channel mapping corresponding to the unique physical mapping further corresponds to the physical interface, the signaling interface, or a combination thereof.

5. The system of claim 3 wherein the transmitter module is a packet switch.

6. The system of claim 3 wherein:
one of the at least two channels of the multi-channel cable of the given length is a first channel;
the received identifier unique to the given length of the multi-channel cable is also unique to the first channel;
the transmitter module is further configured to transmit one or more additional identifiers unique to the given length of the multi-channel cable on the at least two channels according to the channel mapping, each of the one or more additional identifiers also being unique to an additional channel of the at least two channels; and
the signaling interface is further configured to receive the one or more additional identifiers.

7. The system of claim 3 wherein:
the multi-channel cable of the given length and having at least two channels has at least three channels;

two of the at least three channels are a first channel and a second channel, respectively, and the remaining channels of the at least three channels are additional channels;

the received identifier unique to the given length of the multi-channel cable is unique to the first and second channels;

the transmitter module configured to transmit the identifier unique to the first and second channels of the multichannel cable of the given length is further configured to transmit a common identifier that is common to at least a subset of the additional channels; and the signaling interface is further configured to receive the common identifier.

8. The system of claim 3 wherein the transmitter module configured to transmit the identifier unique to the given length of the multi-channel cable is configured to transmit the unique identifier on the at least two channels via a logical signal, and the signaling interface is configured to receive the identifier via the logical signal.

9. The system of claim 2 wherein the received identifier is received on the at least two channels of the multi-channel cable according to a channel mapping, the channel mapping corresponding to the unique physical mapping corresponding to the given length.

10. The system of claim 9 wherein the determination module further includes a table of channel mappings corresponding to respective unique physical mappings corresponding to the respective, multiple predefined lengths.

11. The system of claim 1 wherein the multi-channel cable is an optical cable.

12. The system of claim 1 wherein the reporting module is further configured to report to a craftsperson that an installed cable is of an incorrect length instead of the given length of the multi-channel cable, that a cable of correct length should be installed, or that a port to which the installed cable is coupled is an incorrect port.

13. The system of claim 12 wherein the reporting module is further configured to disable initialization of a transmitter module or a receiver module, the initialization enabling communications traffic via the installed cable.

14. A method for identifying a length of an installed cable, the method comprising:

enabling a signaling interface to receive an identifier unique to the given length of a multi-channel cable, the given length being selected from among multiple predefined lengths, the received identifier being one of a plurality of identifiers, and each of the plurality of identifiers being unique to one of the multiple predefined lengths;

determining whether the received identifier unique to the given length of the multi-channel cable received by the signaling interface matches an expected identifier expected to be received by the signaling interface; and reporting whether the received identifier received matches the expected identifier expected to be received.

15. The method of claim 14 wherein the multi-channel cable has at least two channels with unique physical mapping corresponding to the given length.

16. The method of claim 15 further comprising:

enabling a physical interface to couple with the multi-channel cable; and transmitting the identifier unique to the given length of the multi-channel cable on the at least two channels via the physical interface according to a channel mapping, the channel mapping corresponding to the unique physical mapping corresponding to the given length.

17. The method of claim 16 wherein the channel mapping corresponding to the unique physical mapping further corresponds to the physical interface, the signaling interface, or a combination thereof.

18. The method of claim 16, wherein one of the at least two channels of the multi-channel cable of the given length is a first channel, and the received identifier unique to the given length of the multi-channel cable is also unique to the first channel, the method further comprising:

enabling the signaling interface to receive one or more additional identifiers unique to the given length of the multi-channel cable on the at least two channels according to the channel mapping, each of the one or more additional identifiers being also unique to an additional channel of the at least two channels; and transmitting the one or more additional identifiers on the at least two channels via the physical interface according to the channel mapping.

19. The method of claim 16, wherein the multi-channel cable of the given length and having at least two channels has at least three channels; two of the at least three channels are a first channel and a second channel, respectively, and the remaining channels of the at least three channels are additional channels; and the received identifier unique to the given length of the multi-channel cable is also unique to the first and second channels; the method further comprising:

enabling the signaling interface enabled to receive the identifier unique to the first and second channels to receive a common identifier common to at least a subset of the additional channels; and transmitting the common identifier common to the at least a subset of additional channels on the at least two channels via the physical interface according to the channel mapping.

20. The method of claim 16, wherein enabling the signaling interface to receive the unique identifier includes enabling the signaling interface to receive the identifier via a logical signal; and transmitting the identifier unique to the given length of the multi-channel cable on the at least two channels includes transmitting the unique identifier via the logical signal.

21. The method of claim 15 wherein the received identifier is received on the at least two channels of the multi-channel cable according to a channel mapping, the channel mapping corresponding to the unique physical mapping corresponding to the given length.

22. The method of claim 21 wherein the determining further includes accessing a table of channel mappings corresponding to unique physical mappings corresponding to the respective, multiple predefined lengths.

23. The method of claim 14 wherein the multi-channel cable is an optical cable.

24. The method of claim 14 wherein the reporting further includes reporting to a craftsperson that an installed cable is of an incorrect length instead of the given length of the multi-channel cable, that a cable of a correct length should be installed, or that a port to which the installed cable is coupled is an incorrect port.

25. The method of claim 24 further comprising:

upon or following determining whether the received identifier matches the expected identifier, disabling initialization of communications traffic via the installed cable.

26. An apparatus for identifying a length of an installed cable, the apparatus comprising:

a transmitter module configured to interface with a multi-channel cable having a given length selected from among multiple predefined lengths, the cable having at least two channels with a unique physical mapping corresponding to the given length; and the transmitter module further configured to transmit an identifier unique to the given length of the multi-channel cable on the at least two channels according to a channel mapping, the channel mapping corresponding to the unique physical mapping corresponding to the given length, the transmitted identifier being one of a plurality of identifiers, and each of the plurality of identifiers being unique to one of the multiple predefined lengths.

27. An apparatus for identifying a length of an installed cable, the apparatus comprising:

a receiver module configured to interface with a multi-channel cable having a given length selected from among multiple predefined lengths, the cable having at least two channels with a unique physical mapping corresponding to the given length; and the receiver module further configured to receive an identifier unique to the given length of the multi-channel cable and determine whether the received identifier received matches an expected identifier expected to be received on the at least two channels according to the unique physical mapping corresponding to the given length, the received identifier being one of a plurality of identifiers, and each of the plurality of identifiers being unique to one of the multiple predefined lengths.

28. A communications system, comprising:

a multi-channel cable having a given length selected from among multiple predefined lengths and having at least two channels with a unique physical mapping corresponding to the given length;

a transmitter module configured to transmit an identifier unique to the given length of the multi-channel cable on the at least two channels according to a channel mapping, the channel mapping corresponding to the unique physical mapping corresponding to the given length, the transmitted identifier being one of a plurality of identifiers, and each of the plurality of identifiers being unique to one of the multiple predefined lengths; and a receiver module configured to receive the transmitted, unique identifier and to determine whether the transmitted, unique identifier received matches an expected identifier expected to be received on the at least two channels according to the channel mapping corresponding to the unique physical mapping.

* * * * *